US012704830B2

(12) United States Patent
Coon et al.

(10) Patent No.: US 12,704,830 B2
(45) Date of Patent: Aug. 11, 2026

(54) DETERMINING HIERARCHY CONTEXT FOR INDUSTRIAL DEVICES IN AN INDUSTRIAL SYSTEM

(71) Applicant: Rockwell Automation Technologies, Inc., Mayfield Heights, OH (US)

(72) Inventors: Ryan Coon, Franklin, WI (US); Scott D. Day, Richfield, WI (US); David C. Mazur, Grafton, WI (US); Jonathan A. Mills, Mayfield Heights, OH (US); Todd A. Wiese, Hubertus, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 445 days.

(21) Appl. No.: 18/316,278

(22) Filed: May 12, 2023

(65) Prior Publication Data

US 2024/0377811 A1 Nov. 14, 2024

(51) Int. Cl.
*G05B 19/00* (2006.01)
*G05B 19/4155* (2006.01)

(52) U.S. Cl.
CPC .................... *G05B 19/4155* (2013.01); *G05B 2219/31449* (2013.01)

(58) Field of Classification Search
CPC .................. G05B 19/4155; G05B 2219/31449
See application file for complete search history.

(56) References Cited

U.S. PATENT DOCUMENTS 6,167,464 A 12/2000 Kretschmann
7,352,141 B2 4/2008 Kling
D612,339 S 3/2010 Braun
8,782,539 B2 7/2014 Bump
9,653,910 B2 5/2017 Drake
10,282,285 B2 5/2019 Braun
D862,399 S 10/2019 Andersson
10,572,162 B2 2/2020 Rantanen
10,606,742 B2 3/2020 Braun
10,924,053 B2 2/2021 Hu
11,182,146 B2 11/2021 Tunkkari
11,303,625 B2 4/2022 Hu
11,409,269 B2 8/2022 Hu
2010/0079096 A1 4/2010 Braun
2016/0127207 A1* 5/2016 Zaccaria ............... H04L 43/045 709/224
2017/0359222 A1* 12/2017 Dutta .................... H04L 61/103
2018/0052451 A1* 2/2018 Billi-Duran ...... G05B 19/41835

(Continued)

OTHER PUBLICATIONS

User Manual, PowerFlex 20-HIM-A6 and 20HIM-C6S Him (Human Interface Module), Rockwell Automation Publication 20HIM-UM001E-EN-P—May 2017, 74 pages.

(Continued)

*Primary Examiner* — Aleksey Olshannikov

(57) ABSTRACT

A method includes using a mobile device connected to an industrial network of an industrial system, obtaining a first identity object from an intelligent industrial device of the industrial system, bridging through the intelligent industrial device to obtain a second identity object of a related device of the industrial system that is related to the intelligent industrial device, and using the mobile device, presenting a hierarchy context of the intelligent industrial device to a user based on the identity objects.

20 Claims, 4 Drawing Sheets

(56) References Cited

U.S. PATENT DOCUMENTS

| | | | |
|---|---|---|---|
| 2020/0132773 | A1 | 4/2020 | Gugaliya |
| 2021/0141628 | A1 | 5/2021 | Garrabrant |

OTHER PUBLICATIONS

User Manual, “Configuration and Tuning Terminal Type CTT02”, Bailey Product Instruction E92-501-2, 1989, 204 pages.

Specification, “Control Solutions Strategic Loop Controller Series SLC”, ABB Automation S-CS/CMD-SLC_1, 2000, 12 pages.

* cited by examiner

DETERMINING HIERARCHY CONTEXT FOR INDUSTRIAL DEVICES IN AN INDUSTRIAL SYSTEM

BACKGROUND INFORMATION

The subject matter disclosed herein relates to industrial systems and apparatus.

BRIEF DESCRIPTION

In one aspect, a method includes, using a mobile device connected to an industrial network of an industrial system, obtaining a first identity object from an intelligent industrial device of the industrial system, as well as bridging through the intelligent industrial device to obtain a second identity object of a related device of the industrial system that is related to the intelligent industrial device, and using the mobile device, presenting a hierarchy context of the intelligent industrial device to a user based on the identity objects.

In another aspect, a non-transitory computer readable medium has computer executable instructions which, when executed by a processor of a mobile device connected to an industrial network of an industrial system, cause the mobile device to obtain a first identity object from an intelligent industrial device of the industrial system, bridge through the intelligent industrial device to obtain a second identity object of a related device of the industrial system that is related to the intelligent industrial device, and present a hierarchy context of the intelligent industrial device to a user based on the identity objects.

DETAILED DESCRIPTION

Figure 1:
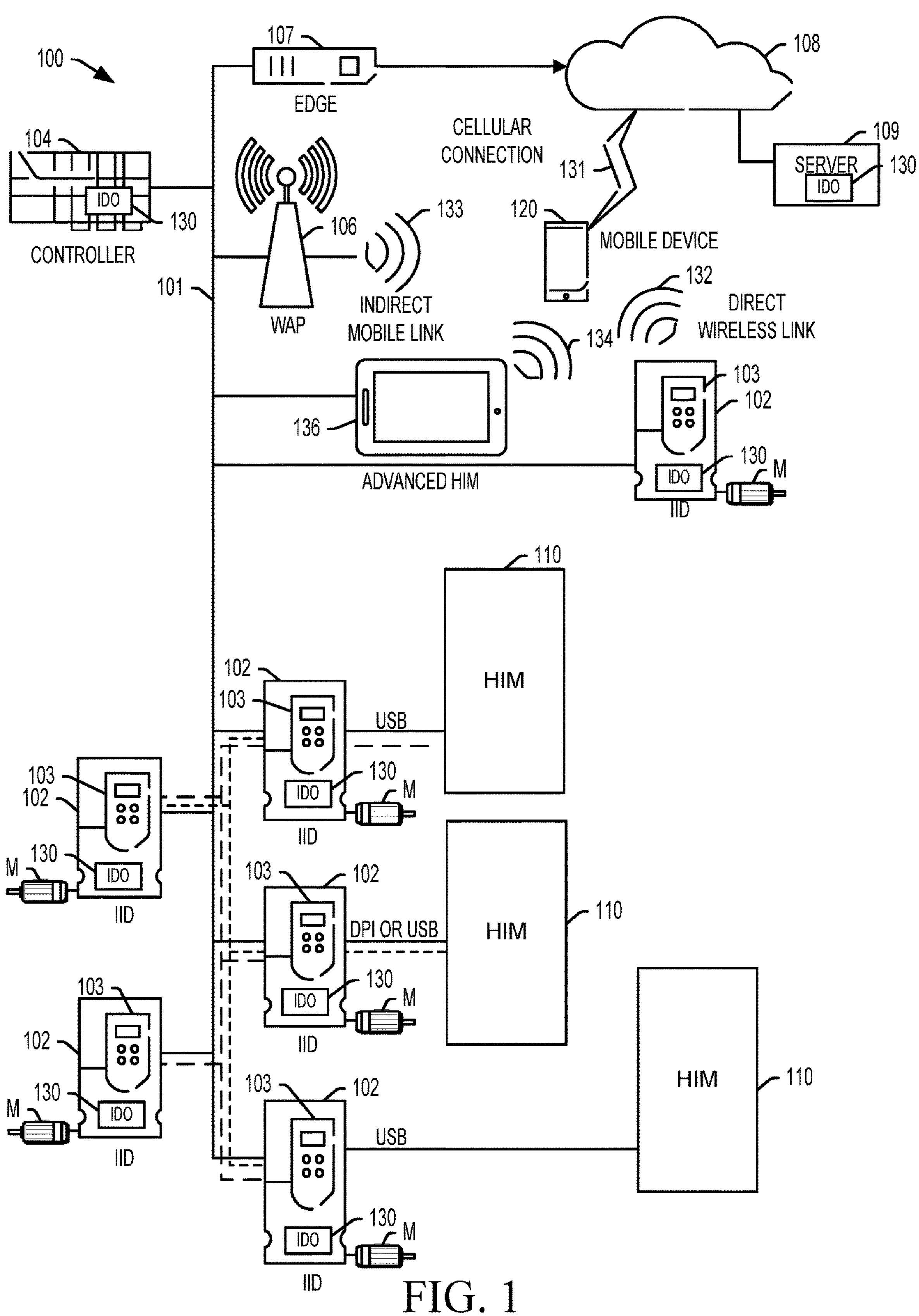
FIG. 1 is a system diagram of an industrial system.

Referring now to the figures, several embodiments or implementations are hereinafter described in conjunction with the drawings, wherein like reference numerals are used to refer to like elements throughout, and various features are not necessarily drawn to scale.

FIG. 1 shows an industrial system 100 having an industrial network 101 and intelligent industrial devices (IID) 102 (e.g., labeled IID in FIG. 1) operatively connected to the industrial network 101. The illustrated system 100 has various possible components, but the illustrated and described components are not all necessary for a given implementation and other system implementations can have more, fewer and/or different components depending on the application. The system 100 also includes one or more human interface modules 103 (also referred to as HIMs) operatively coupled to an associated one of the intelligent industrial devices 102 and/or to the industrial network 101. The industrial network 101 can be or include any suitable type and form of communications network with communications lines and equipment, wired and/or wireless, communications bridging equipment, etc., for example industrial Ethernet or Ethernet/IP, fieldbus compliant networks, etc., configured to support communications between connected devices and systems using one or more protocols, and may include bridges or adapters for interfacing devices communicating on different protocols. The intelligent industrial devices 102 can be any form or type of industrial control component or system, for example, motor drives operative to drive a motor load M as schematically illustrated in FIG. 1, power supplies, other types and forms of industrial control equipment, etc. The industrial system 100 may also include one or more controllers 104 (e.g., rack mounted modules programmable logic controllers (PLCs), I/O modules, etc.) operatively coupled to the industrial network 101, a wireless access point (WAP) 106 operatively coupled to the industrial network 101, and a network edge device 107 operatively coupled with the industrial network 101 to provide communications between the industrial network 101 and a cloud connection 108 to a server 109 and/or other external networks, components and/or systems (not shown). The industrial system 100 and the components thereof provide control and actuator functions to operate an industrial system, such as a manufacturing facility or machines thereof, such as conveyors, motors, valves, power supplies, etc., including operation of one or more connected or independent control loops implemented by processors (not shown) of one or more of the intelligent industrial devices 102, the controller 104, and/or of a remote system such as the cloud-based server 109. In certain implementations, one or more of the intelligent industrial devices 102, the controller 104, and/or the cloud-based server 109 include one or more respective identity objects 130 (e.g., labelled "IDO" in FIG. 1) used to store identity data or information.

Figure 1A:
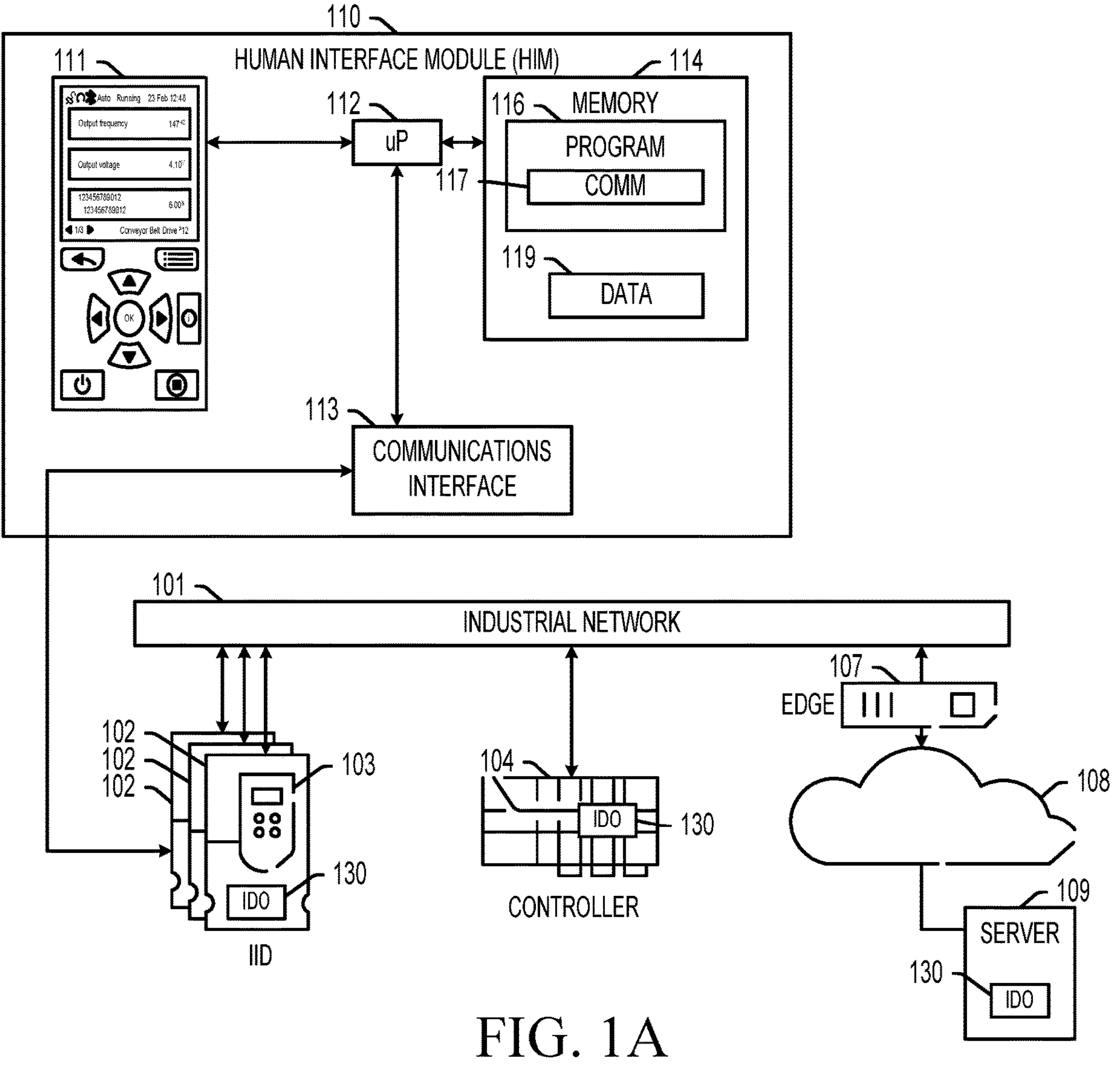
FIG. 1A is a schematic diagram of a human interface module of the industrial system.
Figure 1B:
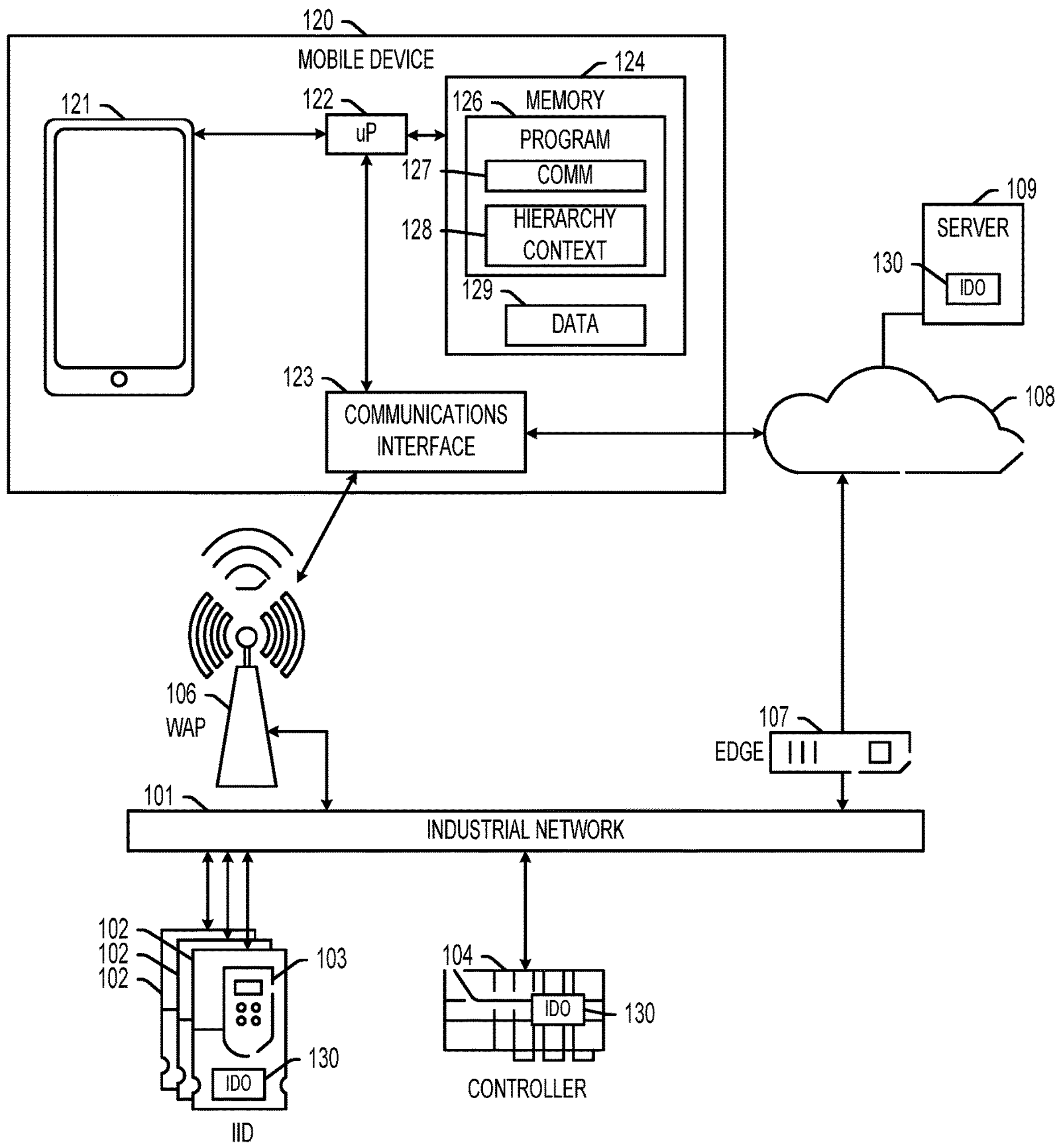
FIG. 1B is a schematic diagram of a mobile device operatively coupled to the industrial system.

The industrial system 100 in one example also includes intelligent HIMs 110 operatively coupled to an associated one of the intelligent industrial devices 102 and/or to the industrial network 101. The HIMs 110 can include human-machine interface devices and systems, such as displays, keyboards or keypads, speakers, microphones, etc. FIG. 1A illustrates an example HIM 110 of the industrial system 100. FIG. 1 further illustrates a mobile device 120 that can be operatively coupled to the devices 102 and other components of the system 100 and to the industrial network 101 by various structures, for example, cellular or other wired or wireless connections to the industrial network 101 via the cloud connection 108 and the network edge device 107 (shown as an optional cellular connection 131 in FIG. 1), wired or wireless connections to one of the intelligent industrial devices 102 and/or to an associated HIM 103 (e.g., shown as a direct wireless link 132 in FIG. 1), a wireless connection via the WAP 106 (e.g., shown as an indirect mobile link 133 in FIG. 1), and/or a wireless connection 134 established between the mobile device 120 and an advanced HIM 136, such as a tablet device operatively coupled by wired or wireless communications to the industrial network 101 as shown in FIG. 1. FIG. 1B shows an example implementation of the mobile device 120 operatively coupled to the industrial system 100.

As shown in the example of FIG. 1A, the intelligent HIMs 110 include an operator or user interface 111, having a graphic and/or textual visual display and various keypad buttons to allow a user to interact with the HIM 110 and an associated one of the intelligent industrial devices 102, as well as a processor 112 operatively coupled with a communications interface 113 operatively coupled with the industrial network 101 and with an associated intelligent industrial device 102, as well as an electronic memory 114. The electronic memory 114 includes processor executable instructions to implement a program 116, including a communications component 117, as well as data storage 119. The program instructions 116 in one example implement the functions described herein. In operation, the HIM 110 communicates with one or more of the intelligent industrial devices 102 and/or associated local HIMs 103, as well as with the controller 104 and/or the cloud-based server 109 via the cloud connection 108 as schematically illustrated in FIG. 1A.

FIG. 1B illustrates an example implementation of the mobile device 120. The mobile device 120 can be any form of portable electronic device, such as a tablet, smart phone, smart watch, etc. The illustrated example mobile device 120 includes a user interface 121, such as a touchscreen allowing a user to interact with one or more apps or programs installed in the mobile device 120. The mobile device 120 includes a processor 122 operatively coupled with a communications interface 123. The communications interface 123 is operatively coupled with the industrial network 101 for wired or wireless communications there between. The processor 122 is operatively coupled to an electronic memory 124. The electronic memory 124 is a non-transitory computer readable medium that includes processor or computer executable instructions to implement a program 126, including a communications component 127 and a hierarchy context component 128, as well as data storage 129. The computer executable program instructions 126 in one example implement an app to perform the functions described herein, and a user can download the app to the mobile device 120. In operation, the mobile device 120 communicates with one or more of the intelligent industrial devices 102 and/or associated local HIMs 103, as well as with the controller 104 and/or the cloud-based server 109 via the cloud connection 108 as schematically illustrated in FIG. 1A. The mobile device 120 in one implementation can communicate with the intelligent industrial devices 102 either directly (e.g., via Bluetooth) or by accessing the industrial network 101 through the WAP 106 and browsing for intelligent industrial devices 102. The cloud connection 108 in one example facilitates accessing data uploaded to the cloud by the intelligent industrial devices 102 via the edge device 107. The cloud connection 108 in one example does not allow the mobile device 120 to interact with intelligent industrial devices 102 directly, although not a strict requirement of all possible implementations. In the illustrated example, the mobile device 120 can communicate with the cloud-based server 109 either directly by cellular connection to the cloud connection 108 and/or through the industrial network 101. The industrial network 101 is configured to connect mobile device 120 to the industrial system 100 and devices and components of the system 100 via the edge device 107.

The computer executable program instructions 126 in the electronic memory 124, when executed by the processor 122 of the mobile device 120, cause the mobile device 120 to obtain a first identity object 130 from an intelligent industrial device 102 of the industrial system 100 and present a hierarchy context of the intelligent industrial device 102 to a user based on the identity object 130. The hierarchy context can be rendered or otherwise presented to a user of the mobile device 120 in any suitable form, including without limitations a visual presentation such as graphical and/or textual information presented on a touchscreen display of the user interface 121, audible information such as spoken words and/or sounds announced to the user via a speaker of the user interface 121, etc. The hierarchy context presentation in one example is through operation of an app (e.g., executable program instructions 126) installed on the mobile device 120 executed by the mobile device processor 122 (FIG. 1B) and can include one or more pages automatically and/or responsively presented by the mobile device 120 and/or selectable options chosen by a user via the user interface 121, such as touchscreen button selections, voice commands or other suitable means.

In one example, the mobile device 120 executes the program instructions 126 to perform various communications functions (e.g., via the execution of the communications component 127 and/or the hierarchy context component 128 in FIG. 1B) to bridge through the intelligent industrial device 102 to obtain a second identity object 130 (e.g., and possibly multiple further identity objects 130 or other information) of one or more related devices (e.g., one or more further intelligent industrial devices 102, the controller 104, and/or the cloud-based server 109) of the industrial system 100 that is/are related to the first intelligent industrial device 102, and the mobile device presents the hierarchy context of the intelligent industrial device 102 to the user based on the identity objects 130 and/or other information.

In the above or other examples, the mobile device 120 executes the program instructions 126 to present an identity of a replaceable component of the intelligent industrial device 102 or of an asset of the intelligent industrial device 102 to the user. In these or other examples, the mobile device 120 executes the program instructions 126 to locate devices 102, 104, 109 and/or resources of the industrial system 100 using ultra-wideband (UWB) communications, global positioning system (GPS) and/or radio frequency identification (RFID) features or functions of the mobile device 120. In these or other examples, the mobile device 120 executes the program instructions 126 to present the hierarchy context including a physical location of the intelligent industrial device 102 to the user. In these or other examples, the mobile device 120 executes the program instructions 126 to present the hierarchy context including a physical location of another device (e.g., 102, 104, 109, etc.) and/or resource of the industrial system 100 to the user. In these or other examples, the mobile device 120 executes the program instructions 126 to present the hierarchy context including a network topology with a logical location of the intelligent industrial device 102 to the user. In these or other examples, the mobile device 120 executes the program instructions 126 to present the hierarchy context including the network topology with a logical location of another device (e.g., a second intelligent industrial device 102, the controller 104, the cloud-based server 109, etc.) and/or resource of the industrial system 100 to the user. In these or other examples, the mobile device 120 executes the program instructions 126 to present the hierarchy context including a position or role of the intelligent industrial device 102 in a process to the user. In these or other examples, the mobile device 120 executes the program instructions 126 to present the hierarchy context including a position or role of another device 102, 104, 109 and/or resource of the industrial system 100 to the user.

In certain implementations, the mobile device 120 with an app, upon connecting to the industrial system 100 via a HIM 110 or WAP 106, is configured to automatically obtain an identity object 130 from an intelligent industrial device 102 and indicate the physical and logical location of the connected intelligent industrial device 102 on an Ethernet network within the system 100 and/or a network topology of the industrial system 100. The mobile device 120 can present the user with a hierarchy including interconnection of all related devices. In certain examples, part of the obtained identity object 130 includes information such as system context and process context, for example, if the intelligent industrial device 102 is being controlled by a PLC of the controller 104, and the mobile device 120 can identify which PLC is controlling the intelligent industrial device 102. The mobile device 120 can obtain contextual information about the intelligent industrial device's place within a process. The mobile device 120 can look at multiple devices in order to determine and present some system hierarchy to the user. In certain implementations, the mobile device 120 can also bridge through the intelligent industrial device 102 in order to read identity objects 130 of other devices that are related to the drive throughout that process and obtain information from them. In one or more implementations, the bridging can be implemented via CIP Routing and/or LLDP (link layer discovery) tables to advise on network topology and thus provide the system hierarchy along with the device main identity object 130. Certain implementations can include the mobile device 120 using additional information to include location based identification through the system via UWB (ultra-wideband communications, GPS, RFID, etc.) for tracking actual location of devices/assets and resources through the generation of location data. For example, if the intelligent industrial device 102 is connected to the controller 104, the intelligent industrial device 102 can store information about the system device that is an originator of its control connection, and the mobile device 120 can obtain information from that PLC, for example, information inside the PLC related to its control of that intelligent industrial device 102. If the intelligent industrial device 102 has a peer control mode configured with control commands coming from a different drive or other (e.g., second) intelligent industrial device 102 in the industrial system 100, the mobile device 120 can collect that contextual information about the first intelligent industrial device 102 and how it is being controlled and information from other such associated devices (e.g., 102, 104, 109), and the mobile device 120 can obtain further information from the other devices in the hierarchy, such as a controlling PLC, peer intelligent industrial device 102 or another network component (e.g., cloud-based server 109, etc.). Other non-limiting examples can include not only the main identity of the device identified through the first identity object 130 but also include identity of assets located in the first intelligent industrial device 102 (e.g., derived from the first identity object or multiple identity object instances 130 represented in the first intelligent industrial device 102). For example, the mobile device 120 and certain implementations can identify replaceable components or resources such as IO option cards, encoder cards, replaceable cooling device (e.g., fans, etc.), replaceable circuit assemblies, capacitor banks, power semiconductor devices, contactors, etc.).

Figure 2:
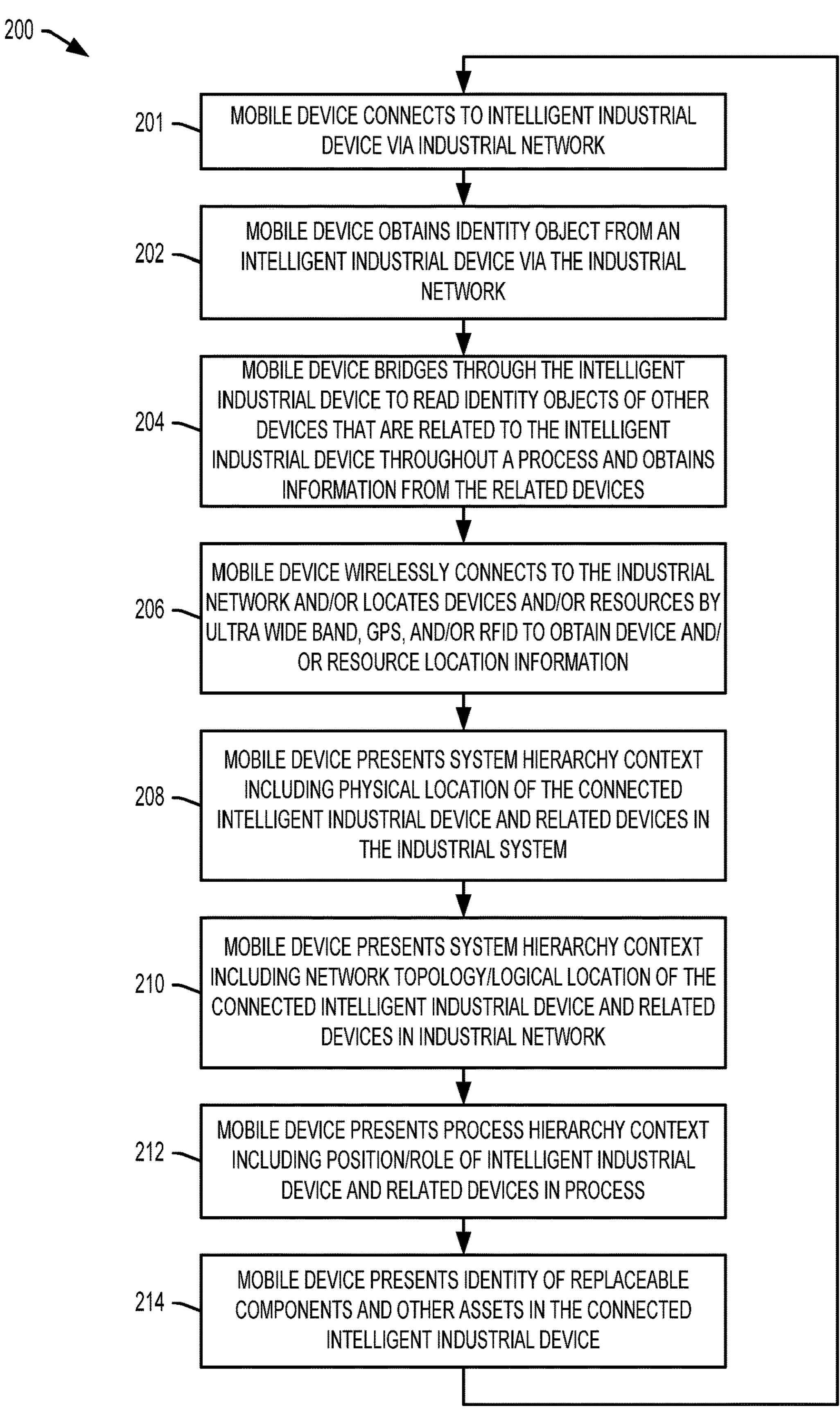
FIG. 2 is a flow diagram of a method.

FIG. 2 shows a method 200 that can be implemented, in whole or in part, using the mobile device 120 and the industrial system 100 in one example. At 201 in FIG. 2, the mobile device 120 is configured with suitable program instructions (e.g., program 126 in FIG. 1B above) and establishes a communications connection to a first intelligent industrial device 102 of the industrial system 100 via the industrial network 101.

At 202 in FIG. 2, mobile device 120 obtains a first identity object 130 from a first intelligent industrial device 102 of the industrial system 100. The first identity object 130 can be obtained through any suitable communications, for example, by the mobile device 120 connecting through wired or wireless connection to any access point of the industrial network 101 and addressing the first intelligent industrial device 102, and/or by the mobile device 120 wirelessly connecting to a first HIM 110 associated with the first intelligent industrial device 102 to provide a DPI or USB connection through the associated HIM 110 to the first intelligent industrial device 102, which in turn provides access to the industrial network 101.

In one implementation, the mobile device 120 bridges through the first intelligent industrial device 102 at 204 in FIG. 2 to obtain a second identity object 130 of one or more related devices of the industrial system, such as a second one of the intelligent industrial devices 102 (e.g., drives), the controller 104, and/or the cloud-based server 109 of the industrial system 100 that is/are related to the intelligent industrial device 102.

At 206 in FIG. 2, the mobile device 120 in certain examples locates one or more devices (e.g., 102, 104, 109) and/or resources of the industrial system 100, for example, using ultra-wideband communications, global positioning system and/or radio frequency identification features and/or functions of the mobile device 120.

The method 200 continues at 208-212 in FIG. 2, with the mobile device 120 presenting the hierarchy context of the intelligent industrial device 102 to the user based on the identity object or objects 130. In one or more examples, the mobile device 120 presents the hierarchy context at 208 including a physical location of the first intelligent industrial device 102 to the user. In these or other examples, the mobile device 120 presents the hierarchy context including a physical location of another device 102, 104, 109 and/or resource of the industrial system 100 to the user, such as a device or devices 102, 104 and/or 109 that is/are related to the first intelligent industrial device 102.

In these or other examples, the mobile device 120 presents the hierarchy context at 210 including a network topology with a logical location of the intelligent industrial device 102 to the user. In one example, the logical location indicates a network address or network position of the first intelligent industrial device 102 to the user at 210. In these or other examples, the mobile device 120 presents the hierarchy context at 210 including the network topology with a logical location of another device 102, 104, 109 and/or resources of the industrial system 100 to the user. For example, the mobile device 120 in certain implementations can indicate positions of the first intelligent industrial device 102 and other devices in the industrial network, such as a graphical rendering on the user interface 121 showing icons or other representations of individual devices 102, 104, 109 and/or resources and network interconnections therebetween, etc.

In these or other examples, the mobile device 120 presents the hierarchy context at 212 including a position or role of the first intelligent industrial device 102 in a process to the user. In these or other examples, mobile device 120 presents the hierarchy context at 212 including a position or role of another device 102, 104, 109 and/or resource of the industrial system 100 in the process to the user.

In these or other examples, the mobile device 120 presents the hierarchy context at 214 including an identity of a replaceable component of the intelligent industrial device 102 or of an asset of the intelligent industrial device 102 to the user. The mobile device 120 in one example implements the method 200 of FIG. 2 is a continuing process, for example, including reconnecting to the first intelligent industrial device 102 or two another intelligent industrial device 102 of the industrial system 100 at 201 and again obtaining one or more identity objects 130 and/or other information by networked communications, ultra-wideband communications, GPS and/or RFID at 202-206 and presenting an updated hierarchy context at one or more of 208-214 as described above.

Various embodiments have been described with reference to the accompanying drawings. Modifications and changes may be made thereto, and additional embodiments may be implemented, without departing from the broader scope of the invention as set forth in the claims that follow. The specification and drawings are accordingly to be regarded in an illustrative rather than restrictive sense. The above examples are merely illustrative of several possible embodiments of various aspects of the present disclosure, wherein equivalent alterations and/or modifications will occur to others skilled in the art upon reading and understanding this specification and the annexed drawings. In addition, although a particular feature of the disclosure may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The following is claimed:

1. A computer-implemented method, comprising:

using a mobile device connected to an industrial network of an industrial system:

establishing a wireless connection to a human interface module (HIM) mounted to an intelligent industrial device of the industrial system;

obtaining, via the wireless connection, a first identity object from the intelligent industrial device;

bridging through the intelligent industrial device via common industrial protocol (CIP) routing to obtain a second identity object of a second intelligent industrial device of the industrial system, wherein the second intelligent industrial device is related to the intelligent industrial device;

obtaining, using a location-tracking signal comprising at least one of a radio frequency identification (RFID) signal and an ultra-wideband (UWB) signal transmitted from the mobile device, a first physical location of the intelligent industrial device and a second physical location of the second intelligent industrial device; and presenting a hierarchy context of the intelligent industrial device to a user based at least on the first identity object and the second identity object, wherein the hierarchy context includes the first physical location and the second physical location.

2. The computer-implemented method of claim 1, further comprising, using the mobile device, presenting an identity of a replaceable component of the intelligent industrial device or of an asset of the intelligent industrial device to the user.

3. The computer-implemented method of claim 1, wherein the bridging through the intelligent industrial device is further implemented via link layer discovery (LLDP) tables.

4. The computer-implemented method of claim 1, wherein the intelligent industrial device comprises a motor drive.

5. The computer-implemented method of claim 1, wherein presenting the hierarchy context includes presenting a resource of the industrial system to the user.

6. The computer-implemented method of claim 5, wherein presenting the hierarchy context includes, using the mobile device, presenting a network topology with a logical location of the intelligent industrial device to the user.

7. The computer-implemented method of claim 6, wherein presenting the hierarchy context includes, using the mobile device, presenting the network topology with a logical location of another device and/or resource of the industrial system to the user.

8. The computer-implemented method of claim 6, wherein presenting the hierarchy context includes, using the mobile device, presenting a position or role of the intelligent industrial device in a process to the user.

9. The computer-implemented method of claim 8, wherein presenting the hierarchy context includes, using the mobile device, presenting a position or role of another device and/or resource of the industrial system to the user.

10. The computer-implemented method of claim 1, wherein presenting the hierarchy context includes presenting a position or role of the intelligent industrial device in a process to the user.

11. The computer-implemented method of claim 10, wherein presenting the hierarchy context includes, using the mobile device, presenting a position or role of another device and/or resource of the industrial system to the user.

12. The computer-implemented method of claim 1, wherein presenting the hierarchy context includes, using the mobile device, presenting a network topology with a logical location of the intelligent industrial device to the user.

13. The computer-implemented method of claim 12, wherein presenting the hierarchy context includes, using the mobile device, presenting the network topology with a logical location of another device and/or resource of the industrial system to the user.

14. The computer-implemented method of claim 1, wherein presenting the hierarchy context includes, using the mobile device, presenting a position or role of the intelligent industrial device in a process to the user.

15. The computer-implemented method of claim 14, wherein presenting the hierarchy context includes, using the mobile device, presenting a position or role of another device and/or resource of the industrial system to the user.

16. A non-transitory computer readable medium having computer executable instructions which, when executed by a processor of a mobile device connected to an industrial network of an industrial system, cause the mobile device to:

establish a wireless connection to a human interface module (HIM) mounted to an intelligent industrial device of the industrial system;

obtain, via the wireless connection, a first identity object from the intelligent industrial device;

bridge through the intelligent industrial device via common industrial protocol (CIP) routing to obtain a second identity object of a second intelligent industrial device of the industrial system, wherein the second intelligent industrial device is related to the intelligent industrial device;

obtain, using a location-tracking signal comprising at least one of a radio frequency identification (RFID) signal and an ultra-wideband (UWB) communication signal transmitted from the mobile device, a first physical location of the intelligent industrial device and a second physical location of the second intelligent industrial device; and present a hierarchy context of the intelligent industrial device to a user based at least on the first identity object and the second identity object, wherein the hierarchy context includes the first physical location and the second physical location.

17. The non-transitory computer readable medium of claim 16, having computer executable instructions which, when executed by the processor, cause the mobile device to present an identity of a replaceable component of the intelligent industrial device or of an asset of the intelligent industrial device to the user.

18. The non-transitory computer readable medium of claim 16, wherein the bridging through the intelligent industrial device is further implemented via link layer discovery (LLDP) tables.

19. The non-transitory computer readable medium of claim 16, having computer executable instructions which, when executed by the processor, cause the mobile device to present a network topology with a logical location of the intelligent industrial device to the user.

20. The non-transitory computer readable medium of claim 16, having computer executable instructions which, when executed by the processor, cause the mobile device to present a position or role of the intelligent industrial device in a process to the user.

* * * * *